R. D. MOWRY.
STORAGE BATTERY.
APPLICATION FILED MAR. 15, 1917.
1,232,710.
Patented July 10, 1917.
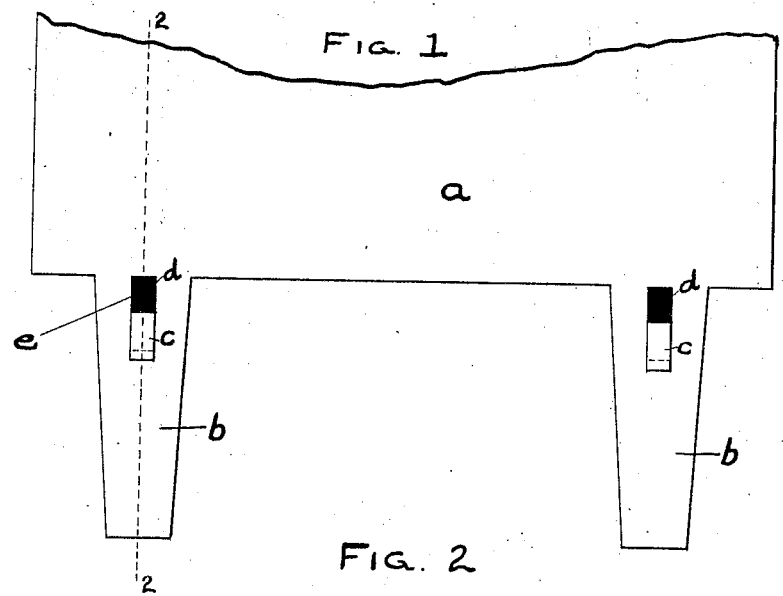
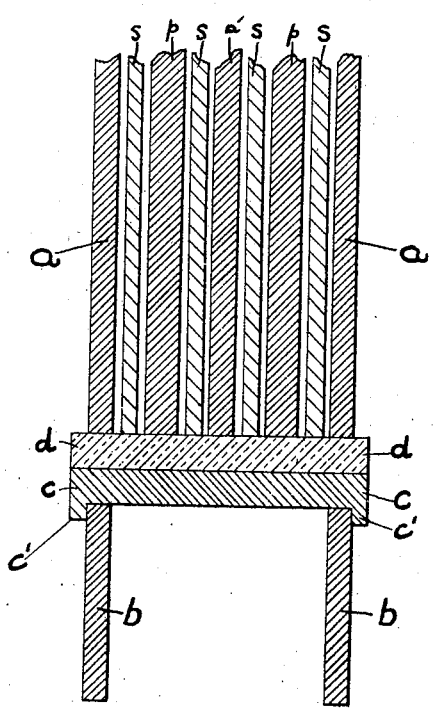
WITNESSES:
Robert Dobberman
Fidelis Maichen
INVENTOR
Robert D. Mowry
BY
Rector Hibben Davis Macauley
His ATTORNEYS

UNITED STATES PATENT OFFICE.

ROBERT D. MOWRY, OF CHICAGO, ILLINOIS.

STORAGE BATTERY.

1,232,710.

Specification of Letters Patent.

Patented July 10, 1917.

Application filed March 15, 1917. Serial No. 155,009.

*To all whom it may concern:*

Be it known that I, ROBERT D. MOWRY, a citizen of the United States, residing at Chicago, in the county of Cook and State of Illinois, have invented certain new and useful Improvements in Storage Batteries, of which the following is a specification.

My invention relates more particularly to the means for supporting the elements or plates of the battery a sufficient distance above the bottom of the cell to prevent short-circuiting by the active material falling from the plates, and for maintaining the elements in their assembled position. It consists in providing means for this purpose which is inexpensive to manufacture, adds but little to the weight of the elements and presents no supporting surfaces upon which active material sloughed off by the elements might lodge and short-circuit the cell.

In the accompanying drawing forming a part of this application, Figure 1 is a side elevation of so much of a battery element as is necessary to an understanding of my invention; and Fig. 2 is a transverse vertical section thereof upon the line 2—2 of Fig. 1.

The cell comprises a positive element, a negative element and separator plates which, except in the respects hereinafter pointed out, are or may be of any usual or approved type. The positive element is shown as comprising the outside plates $a$, $a$, and an intermediate plate $a'$, which are connected up in the usual manner at the top by means which it is unnecessary for the present purpose to illustrate. The negative element comprises a pair of plates $p$, $p$, which are likewise connected at the top in any usual or approved manner and between adjacent plates are inserted separators $s$, which also may be of any usual or suitable character, as for example, they may consist merely of thin wooden plates permeable by the electrolyte. The above elements are or may be all of ordinary character and further description thereof is unnecessary. Two of the plates spaced a sufficient distance apart are provided with feet $b$, $b$, which are preferably formed integral with the plates and of the same material. In the case of the ordinary lead cell the feet are cast integral with the plates and in the form of the invention illustrated the feet are cast upon the outside plates of the positive element. Preferably there are two feet upon each outside plate, there being four feet in all, and through the upper ends of the feet adjacent the body of the plates are formed transverse slots $e$, the slots on one outside plate being in register respectively with the corresponding slots in the other outside plate. A key-bar $c$ extends through each pair of registering slots and is formed at its ends with heads or lugs $c'$, which are of a size to be inserted through the slots. When the bar has been inserted in place and dropped down so that the lugs $c'$ overlap the edges thereof the outside plates are held from outward movement. In order to hold the key-bar from displacement and to support the negative element and the separator plates, pieces $d$ of insulating material, such as hard rubber, are inserted in the registering pairs of slots above the key-bars substantially filling said slots and extending beyond the outer faces of the outside plates. In assembling the cell it is convenient to first assemble the positive and negative elements, then insert between the plates thereof the separator plates and finally lock the outside plates together by means of the key-bar and separator strips in the manner above described. When the assemblage rests upon the feet the negative element and starter plates rest upon the insulating strips. When the active material begins to disintegrate and slough off the plates it falls to the bottom of the receptacle containing the cell where it is innocuous so far as affecting the insulation is concerned because one of the elements is supported out of contact therewith. If any active material should lodge upon the insulator strips it would not short-circuit the cell because of the fact that the separator plates rest at their lower edges on said strips.

The improved construction is inexpensive and easy to make and assemble and is very effective in preventing dislocation of the elements of the battery relative to each other and short-circuiting thereof by detached active material.

I have described the outside plates and legs of the cell as forming part of the positive element, but obviously they could be formed upon the negative element if desired.

I claim:

1. A storage battery comprising a plurality of positive plates, a plurality of negative plates and insulating plates, legs formed on spaced plates, a key-bar connecting the outside plates and an insulating strip mounted on the key-bar and supporting the remaining plates.

2. In a storage battery, a positive and a negative element, each comprising a number of plates, the plates of one element alternating with the plates of the other, one of said elements being provided with supporting legs, key-rods extending through said legs and maintaining them in relative position, and strips of insulating material maintaining the key-rods in position and supporting the other said element.

3. In a storage battery, a pair of elements each comprising a series of plates, the plates of one element alternating with the plates of the other element and both outside plates being formed of the same element, supporting feet on said outside plates, registering slots formed in said feet, keys inserted respectively in each pair of registering slots, and insulating strips inserted over the respective keys and supporting the other said element.

4. In a storage battery, a pair of elements, each composed of a series of plates, the plates of one element alternating with the plates of the other element, and the outside plates being formed on one of said elements, legs cast integral with said outside plates and formed with registering slots, a key $c$ having terminal heads $c'$ inserted in each pair of registering slots and locking said outside plates together, and an insulating strip $d$ superposed on each key and supporting the other said element, and separator plates interposed between the plates of said elements and also supported by said insulator strips.

ROBERT D. MOWRY.